United States Patent Office 2,949,366
Patented Aug. 16, 1960

2,949,366

COLD MILK PUDDINGS AND METHOD OF PRODUCING THE SAME

Austin R. Hunter, La Mesa, and James K. Rocks, San Diego, Calif., assignors to Kelco Company, San Diego, Calif., a corporation of Delaware No Drawing. Filed Nov. 22, 1957, Ser. No. 698,048

24 Claims. (Cl. 99—131)

This invention relates to edible puddings or gels, and more particularly to an alginate composition additive for making instant cold milk puddings.

Milk pudding powders are now widely sold and used for rapid production of nutritious and desirable desserts. These powders contain chocolate or other taste-imparting ingredients, vanillin or other flavoring and salt, together with a gelatinizing agent which, when added to hot or cold milk, produce a pudding on standing. These gelatinizing and pudding-forming agents have been types of alginate compositions, or starch or rennet, respectively. The old starch or paste-type puddings, in contrast to our herein disclosed gel-type of puddings, are not moldable. That is, they cannot be formed in a mold and then discharged therefrom retaining the shape of the mold. They have the further disadvantage in that the paste tends to coat the inside of the mouth so as to shut off the taste buds, thereby not giving the full benefit of the flavor. The gel-type pudding provides a much cleaner taste because it does not stick to the mouth as the paste does.

In the past, so far as we are aware, no gelatinizing agent has been successfully used with skim milk solids and water to form a satisfactory pudding of any type body. Furthermore, no satisfactory pudding composition has ever been developed that, when added to cold water or cold milk, will give a pudding with a custard-like or moldable body such as can be obtained with certain hot milk pudding formulations.

The essential requirements in a gelatinizing additive are that it should be substantially tasteless and that the additive, according to the present invention, should be readily soluble in cold water without forming lumps or granules so that the finished pudding, after setting for about a half hour, should be firm, smooth and tender. It should not be grainy nor have fish eyes.

According to the present invention, highly satisfactory and desirable milk puddings may be prepared by adding to cold water a composition comprising a milk-soluble alginate composition, an acidic ingredient and a milk solid, either skim or whole.

Generally, any fine mesh, water-soluble alginate, such as sodium, potassium and ammonium alginate, when mixed with readily dispersible milk solids, and added to water, will form a product with a gel-like body that can be called a pudding. However, such a pudding is not satisfactory and is not acceptable commercially because it is grainy, contains fish eyes and is too slow to set, the setting time being several hours. For commercial use, it is desirable that the modern instant pudding be complete and mixed as a powder in one package ready for mixing with tap water by the housewife at room temperatures between 15° and 25° C. This type of pudding will also mix and set properly with hot water, but the cold water mix provides the advantages of faster setting and eliminates heating and cooling the water.

In order that the alginate additive perform properly as a gelatinizing agent, it is desirable that it be completely dissolved in the cold water before the calcium from the milk solids is available to react with the alginate. To insure this, a suitable sequestering agent or solubilizing salt, such as trisodium phosphate, disodium phosphate, tetrasodium pyrophosphate, sodium tripolyphosphate and the similar potassium phosphates, should be added to the alginate. The alginates found satisfactory for use in the present invention are the alkali metal and ammonium water-soluble alginates. In this composition, the phosphate sequesters the milk calcium so as to prevent reaction between it and the alginate. This allows the alginate to go into solution. If a sequestering agent is not used, the alginate and the calcium at once form a grainy precipitate and the pudding is not satisfactory. However, when the proper amount of the sequestering agent is used, the setting time of the pudding is delayed. In addition, the pudding body is soft and edibility is improved.

It has now been surprisingly found that the foregoing disadvantages can be overcome and a highly desirable milk-type pudding composition can be prepared by the combination of a water-soluble alginate, a sequestering agent and a small amount of a slowly-soluble acid, such as fumaric or adipic acid, or a substance that is slowly hydrolyzed in the presence of water to an acid, such as glucono-delta-lactone, or by the addition of an acid salt, such as potassium bitartrate.

We have found, as aforementioned, that various combinations of alginates, the above sequestering agents and acidic ingredients can be used with milk solids to give a cold milk pudding formulation. However, only where the proper amount of acidic agent is used with the alginate and sequestering agent is a pudding produced that is satisfactory from the standpoints of setting time, smoothness, body and all-around edibility.

We have used two methods of preparing the additive which is preferably comprised of a milk-soluble alkali algin composition, such as sodium alginate with a sequestering agent, such as trisodium phosphate; and an acidic ingredient, such as glucono-delta-lactone. In the first method, the trisodium phosphate is wet incorporated with the alginic acid in the manufacture of sodium phosphoalginate described in the U.S. Patent No. 2,485,934 to Arnold B. Steiner and U.S. Patent No. 2,097,228 to Howard J. Lucas.

In general terms, the sequestering agent in the above wet method may be any edible soluble salt of an acid of which the calcium salt is substantially insoluble or undissociated in water, and of which the cation does not precipitate algin. Thus, this component of the composition may be referred to broadly as a solubilizing salt.

The proportion of the solubilizing salt, which in some quantity is an essential component of the blend, will obviously vary with the nature of the specific salt used, and also, to a lesser degree, with the relative compatibility of the alginate with calcium salts, the lower viscosity algins being somewhat less susceptible to calcium precipitation than those of higher viscosity. It is thus impossible to fix a definite limit to the proportion of solubilizing salt though it is the general practice to use it in a proportion of about 10% of the dry weight of the composition, thus allowing some latitude to compensate for variables in the mix itself. However, for example, in using trisodium phosphate as the solubilizing salt, it has been found that the preferable range of amounts for it is between 15% and 25% of the dry weight of the alginate.

Thus, we may have, at one end of the viscosity range, a composition containing about 40% dry weight of alginate, 50% dispersing agent, such as dextrin, and 10% solubilizing salt, and at the other end of the range, a composition containing about 90% alginate and 10% solubilizing salt, with no dispersing agent.

The other method to make the gelatinizing agent, according to the present invention, is to dry blend a low calcium ash water-soluble alginate, such as sodium alginate, with a lesser amount of sequestering agent than as above, and one of the acidic ingredients. In this mixture, a lesser amount of the sequestering agent is required. Desirable puddings have been made where the dry blended trisodium phosphate has been added in amounts from 4% to 15% based on the weight of the alginate, and the acidic ingredient added in amounts sufficient to control the setting time.

In view of the fact that some of the other ingredients in the pudding, such as cocoa, vary in pH, the required amount of the acidic ingredient to be added to the gelatinizing agent is further varied.

The following examples will serve to illustrate the formation of satisfactory puddings from alginates and skim milk solids in accordance with our invention:

Example 1

Sodium alginate made from alginic acid with which trisodium phosphate was wet incorporated:

| | Gm. |
|---|---|
| Sodium phosphoalginate (40% dispersing agent) | 5.0 |
| Glucono-delta-lactone | 0.8 |
| Skim milk solids | 24.2 |

The above ingredients were mixed and added to a cup of water in a mixing bowl while being stirred at a slow speed on a household electric mixer. They were stirred for one minute, poured into gel dishes and placed in a refrigerator. This formula produced a smooth firm pudding that was ready to eat in 30 minutes. Essentially the same result was obtained with hot water as with room temperature water.

The examples to follow were also prepared in the same manner:

Example 2

Sodium alginate made from alginic acid with which trisodium phosphate was wet incorporated:

| | Gm. |
|---|---|
| Sodium phosphoalginate (40% dispersing agent) | 5.0 |
| Potassium bitartrate | 0.2 |
| Skim milk solids | 24.2 |

This also produced a smooth firm pudding but it wasn't quite as good as that produced with the glucono-delta-lactone.

Example 3—Dietetic chocolate pudding formula

Sodium alginate made from alginic acid with which trisodium phosphate was wet incorporated:

| | Gm. |
|---|---|
| Sodium phosphoalginate (40% dispersing agent) | 5.0 |
| Glucono-delta-lactone | 0.5 |
| Sodium sucaryl | 0.15 |
| Sodium saccharin | 0.05 |
| Sodium chloride | 0.25 |
| Vanillin | 0.1 |
| Cocoa | 5.0 |
| Commercial instant skim milk solids | 24.2 |

The above dry mixture was added to one cup of tap water while stirring with an electric mixer at the speed indicated for prepared mixes. It was stirred for one minute, poured into gel dishes, and placed in a refrigerator. It was ready to eat in 30 minutes.

Example 4—Non-dietetic chocolate pudding

Sodium alginate made from alginic acid with which trisodium phosphate was wet incorporated:

| | Gm. |
|---|---|
| Sodium phosphoalginate (40% dispersing agent) | 10.0 |
| Glucono-delta-lactone | 0.5 |
| Sodium chloride | 0.5 |
| Vanillin | 0.2 |
| Cocoa | 15.0 |
| Sugar | 80.0 |
| Commercial skim milk solids | 48.4 |

The above dry mixture was added to two cups of water in a bowl while stirring at the slowest possible speed with an electric mixer. It was stirred for one minute, poured into gel dishes and placed in a refrigerator. It was an excellent pudding and ready to eat in 30 minutes.

As can be seen in the above formulas, the amount of the acidic ingredients, such as glucono-delta-lactone, can be varied with the amount of cocoa, since the latter itself varies in acidity and, therefore, the exact amount of the acidic ingredient cannot be stated without knowing the acidity of the cocoa to be added.

It has also been found that the quantity of skim milk solids can be widely varied. At about both half and double the amounts indicated in the above examples, firm puddings were formed with variation mainly as to the body and speed of formation. In these formulations a readily-dispersible instant skim milk powder is preferred. This type of product is commercially available. A finely divided skim milk powder has a tendency to form lumps and tends to produce an uneven textured pudding.

Example 5

Sodium alginate made from alginic acid with which trisodium phosphate was wet incorporated:

| | Gm. |
|---|---|
| Sodium phosphoalginate (40% dispersing agent) | 2.5 |
| Glucono-delta-lactone | 0.8 |
| Commercial instant chocolate milk drink mix | 29.5 |

The above dry mixture was added to 4 fluid ounces (½ cup) of tap water and the mixture was stirred with a teaspoon for one minute. It was then poured into a gel dish and placed in a refrigerator. It formed an excellent chocolate pudding in 30 minutes.

Example 6

| | Gm. |
|---|---|
| Sodium alginate (fine mesh) | 2.4 |
| Trisodium phosphate | 0.2 |
| Glucono-delta-lactone | 0.3 |
| Skim milk solids | 24.2 |

This formula dry blended and added to one cup of cold water produced a smooth firm pudding that was ready to eat in 30 minutes.

It is understood that the examples are given by way of illustration only, and are not to be considered as a limitation on the scope of the invention as defined in the appended claims.

We claim:

1. A new and useful composition suitable for producing a milk pudding comprising a water-soluble alginate; a minor proportion of an edible phosphate solubilizing salt of which the calcium salt is substantially insoluble in water, and of which the cation does not precipitate algin; a slowly soluble edible acidic ingredient, and milk solids.

2. A new and useful composition suitable for producing a cold-type milk pudding comprising a water-soluble alginate; a minor proportion of an edible phosphate solubilizing salt of which the calcium salt is substantially insoluble in water, and of which the cation does not precipitate algin; an edible acidic ingredient which slowly liberates hydrogen ions in solution, and milk solids.

3. A new and useful composition suitable for producing a cold-type milk pudding comprising a water-soluble alkali alginate; 4% to 15%, based on the weight of the dry alginate, of a sequestering agent selected from the group consisting of trisodium phosphate, disodium phosphate, tetrasodium pyrophosphate, sodium tripolyphosphate, tripotassium phosphate, tetrapotassium pyrophosphate and potassium tripolyphosphate; a slowly soluble edible acidic ingredient, and milk solids.

4. A new and useful composition according to claim 3 in which said acidic ingredient is one of the group consisting of fumaric acid, adipic acid, glucono-delta-lactone and potassium bitartrate.

5. A new and useful composition suitable for producing a cold-type milk pudding comprising a milk-soluble phosphoalginate, milk solids, and an edible acidic ingredient which slowly liberates hydrogen ions in solution, said acidic ingredient being present in an amount sufficient to control the setting time of the pudding.

6. A new and useful composition suitable for producing a pudding prepared from milk solids comprising a water-soluble alkali alginate having a low calcium ash content; 4% to 15%, based on the dry weight of the alginate, of an edible phosphate solubilizing salt of which the calcium salt is substantially insoluble in water, and of which the cation does not precipitate algin; and an edible acidic ingredient which slowly liberates hydrogen ions in solution, said salt and acidic ingredient being dry blended with said alginate.

7. A new and useful composition suitable for producing a milk pudding comprising 5.0 gm. of sodium phosphoalginate, 0.8 gm. of glucono-delta-lactone, and 10 to 50 gm. of milk solids.

8. A new and useful composition suitable for producing a cold-type milk pudding comprising 2.4 gm. of a fine mesh sodium alginate, 0.2 gm. of trisodium phosphate, 0.3 gm. of glucono-delta-lactone, and 10 to 50 gm. of milk solids.

9. A new and useful composition suitable for producing a cold-type milk pudding comprising 10 gm. of sodium phosphoalginate, said phosphoalginate including 40% of a dispersing agent; 0.5 gm. of glucono-delta-lactone, 0.5 gm. of sodium chloride, 0.2 gm. of vanillin, 15.0 gm. of cocoa, 80 gm. of sugar, and 20 to 100 gm. of milk solids.

10. A new and useful composition suitable for producing a cold-type milk pudding comprising 0.5 gm. of glucono-delta-lactone, 0.15 gm. of sodium sucaryl, 0.05 gm. of sodium saccharin, 0.25 gm. of sodium chloride, 0.1 gm. of vanillin, 5.0 gm. of cocoa, 24.2 gm. of skim milk solids; and 5.0 gm. of sodium phosphoalginate, said phosphoalginate including 40% of a dispersing agent.

11. A method of producing a milk pudding mix comprising wet incorporating alginic acid with a minor proportion of an edible phosphate solubilizing salt of which the calcium salt is substantially insoluble in water and of which the cation does not precipitate algin, to produce a milk-soluble alginate; and dry mixing said alginate with milk solids and with an edible acidic ingredient which slowly liberates hydrogen ions in solution.

12. A method of producing a milk pudding mix which comprises dry blending a water-soluble alkali alginate having a low calcium ash content; 4% to 15%, based on the weight of the alginate, of an edible phosphate solubilizing salt of which the calcium salt is substantially insoluble in water and of which the cation does not precipitate algin; milk solids; and an edible acidic ingredient which slowly liberates hydrogen in solution, said acidic ingredient being added in an amount sufficient to control the setting time of a pudding prepared from said mix and water.

13. A method of producing a milk pudding mix comprising wet incorporating 40% to 90% dry weight alginic acid with a minor proportion of an edible phosphate solubilizing salt of which the calcium salt is substantially insoluble in water and of which the cation does not precipitate algin, to produce a milk-soluble alginate; drying said alginate, and admixing said alginate with 2 to 10 gm. of milk solids for each gram of alginate, and with an edible acidic ingredient which slowly liberates hydrogen ions in solution, said acidic ingredient being added in an amount sufficient to control the setting time of a pudding prepared from said mix and water.

14. The method according to claim 13 in which said salt is one of the group consisting of trisodium phosphate, disodium phosphate, tetrasodium pyrophosphate, sodium tripolyphosphate, tripotassium phosphate, tetrapotassium pyrophosphate and potassium tripolyphosphate, and in which said acidic ingredient is one of the group consisting of fumaric acid, adipic acid, glucono-delta-lactone and potassium bitartrate.

15. A method of producing a milk pudding mix comprising preparing sodium phosphoalginate by wet incorporating alginic acid with trisodium phosphate, admixing said phosphoalginate with an amount of glucono-delta-lactone sufficient to control the setting time of a pudding prepared from said mix and water, and with 2 to 10 gm. of milk solids for each gram of phosphoalginate.

16. A method of producing a milk pudding mix comprising admixing 2.4 gm. of sodium alginate, 0.2 gm. of trisodium phosphate, 0.3 gm. of glucono-delta-lactone, and 24.2 gm. of skim milk solids.

17. A method of producing a milk pudding composition comprising admixing a water-soluble alginate, a slowly soluble edible acidic ingredient, an edible phosphate solubilizing salt of which the calcium salt is substantially insoluble in water and of which the cation does not precipitate algin, and milk solids, and introducing said mixture into the desired quantity of cold water.

18. A method of producing a milk pudding composition which comprises introducing into cold water a dry mixture of a water-soluble alkali alginate, an edible acidic ingredient which slowly liberates hydrogen ions in solution, an edible phosphate solubilizing salt of which the calcium salt is substantially insoluble in water and of which the cation does not precipitate algin, and milk solids.

19. A method of producing a cold milk pudding comprising admixing the following materials with water in the amounts set forth for each cup of water so employed:

|  | Gm. |
| --- | --- |
| Sodium phosphoalginate (40% dispersing agent) | 5.0 |
| Glucono-delta-lactone | 0.8 |
| Skim milk solids | 24.2 |

20. A method of producing a cold milk pudding comprising admixing the following materials with water in the amounts set forth for each cup of water so employed:

|  | Gm. |
| --- | --- |
| Sodium phosphoalginate (40% dispersing agent) | 5.0 |
| Potassium bitartrate | 0.2 |
| Skim milk solids | 24.2 |

21. A method of producing a cold milk pudding comprising admixing the following materials with water in the amounts set forth for each cup of water so employed:

|  | Gm. |
| --- | --- |
| Sodium phosphoalginate (40% dispersing agent) | 5.0 |
| Glucono-delta-lactone | 0.5 |
| Sodium sucaryl | 0.15 |
| Sodium saccharin | 0.05 |
| Sodium chloride | 0.25 |
| Vanillin | 0.1 |
| Cocoa | 5.0 |
| Commercial instant skim milk solids | 24.2 |

22. A method of producing a cold milk pudding comprising admixing the following materials with water in the amounts set forth for each two cups of water so employed:

| | Gm. |
|---|---|
| Sodium phosphoalginate (40% dispersing agent) | 10.0 |
| Glucono-delta-lactone | 0.5 |
| Sodium chloride | 0.5 |
| Vanillin | 0.2 |
| Cocoa | 15.0 |
| Sugar | 80.0 |
| Commercial milk solids | 48.4 |

23. A method of producing a cold milk pudding comprising admixing the following materials with water in the amounts set forth for each cup of water so employed:

| | Gm. |
|---|---|
| Sodium alginate (fine mesh) | 2.4 |
| Trisodium phosphate | 0.2 |
| Glucono-delta-lactone | 0.3 |
| Skim milk solids | 24.2 |

24. A method of producing a milk pudding mix comprising preparing sodium phosphoalginate by wet incorporating alginic acid with trisodium phosphate and a dispersing agent, drying said sodium phosphoalginate, admixing 5 gm. of said sodium phosphoalginate with 0.8 gm. of glucono-delta-lactone and with 24.2 gm. of skim milk solids.

References Cited in the file of this patent

UNITED STATES PATENTS

| | | |
|---|---|---|
| 2,536,708 | Angermeier | Jan. 2, 1951 |
| 2,686,127 | McDowell | Aug. 10, 1954 |
| 2,803,551 | Helgren | Aug. 20, 1957 |
| 2,808,337 | Gibsen | Oct. 1, 1957 |
| 2,809,893 | Poarch et al. | Oct. 15, 1957 |